United States Patent
Kurita et al.

(10) Patent No.: US 9,378,854 B2
(45) Date of Patent: Jun. 28, 2016

(54) CORE CATCHER

(75) Inventors: Tomohisa Kurita, Kawasaki (JP); Mika Tahara, Yokohama (JP); Mitsuo Komuro, Yokohama (JP); Noriyuki Katagiri, Yokohama (JP); Masashi Tanabe, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 384 days.

(21) Appl. No.: 13/470,723

(22) Filed: May 14, 2012

(65) Prior Publication Data

US 2012/0300893 A1  Nov. 29, 2012

(30) Foreign Application Priority Data

May 25, 2011 (JP) ................. 2011-117115

(51) Int. Cl.
*G21C 9/016* (2006.01)
*G21C 15/18* (2006.01)

(52) U.S. Cl.
CPC ............... *G21C 9/016* (2013.01); *G21C 15/18* (2013.01); *Y02E 30/40* (2013.01)

(58) Field of Classification Search
USPC ........................................................ 376/280
See application file for complete search history.

(56) References Cited

U.S. PATENT DOCUMENTS

| | | | |
|---|---|---|---|
| 3,607,630 A * | 9/1971 | West ................. | G21C 9/00 165/168 |
| 4,464,333 A * | 8/1984 | Wohlsen ............ | G21C 9/016 376/280 |
| H91 H | 7/1986 | Gabor et al. | |
| 6,347,129 B1 | 2/2002 | Kolev | |
| 2009/0080589 A1 * | 3/2009 | Sato .................. | G21C 9/016 376/280 |
| 2010/0239061 A1 * | 9/2010 | Aoki et al. ........ | 376/250 |
| 2012/0051485 A1 * | 3/2012 | Goda et al. ........ | 376/280 |
| 2012/0269312 A1 * | 10/2012 | Kondo et al. ..... | 376/280 |

FOREIGN PATENT DOCUMENTS

| | | |
|---|---|---|
| JP | 9-500207 | 1/1997 |
| JP | 11-503234 | 3/1999 |
| JP | 2007-225356 | 9/2007 |

(Continued)

OTHER PUBLICATIONS

Extended European Search Report dated Dec. 22, 2014 in European Patent Application No. 12168135.7.

(Continued)

*Primary Examiner* — Sean P Burke
(74) *Attorney, Agent, or Firm* — Oblon, McClelland, Maier & Neustadt, L.L.P.

(57) ABSTRACT

A core catcher includes a holding surface that catches and holds corium and that introduces a surrounding coolant into the core catcher and cool the core catcher by heat exchange with the introduced coolant. The holding surface and the cooling unit are constructed by arranging blocks which each include a polyhedron having at least one pair of parallel surfaces and having an opening portion formed in a surface located in a lateral direction when a first surface that is one of the parallel surfaces is arranged as a bottom surface and are configured such that the polyhedrons communicate with each other via the opening portion when the polyhedrons are arranged adjacent in the lateral direction. The core catcher can achieve easier installation of the blocks without an increase in installation cost.

10 Claims, 6 Drawing Sheets

(56) References Cited

FOREIGN PATENT DOCUMENTS

| | | |
|---|---|---|
| JP | 2010-261726 | 11/2010 |
| WO | WO 2010131379 A1 * | 11/2010 |

OTHER PUBLICATIONS

Office Action issued Sep. 30, 2014 in Japanese Patent Application No. 2011-117115.

* cited by examiner

CORE CATCHER

BACKGROUND OF THE INVENTION

1. Field of the Invention

The present invention relates to a core catcher.

2. Description of the Related Art

If supply of water into a reactor pressure vessel is stopped or cooling water is lost due to a rupture in piping connected to the reactor pressure vessel in a water-cooled type reactor, a reactor water level drops to expose a reactor core (which will be simply referred to as "core", hereinafter), which may result in insufficient cooling of the core. In anticipation of such a case, the idea of automatically bringing the reactor to emergency shutdown upon receiving a signal of low water level and submerging and cooling the core by an ECCS (emergency core cooling system) injecting a coolant has been adopted to prevent a meltdown accident.

However, though a situation in which the emergency core cooling system described above does not work and other devices for injecting water into the core are not available is extremely unlikely to occur, it may still occur. In such a situation, a drawdown in the reactor water level exposes the core, and the core fails to be sufficiently cooled. Decay heat continuously generated even after shutdown of the reactor raises fuel rod temperature, which may lead ultimately to core meltdown.

In such a case, high-temperature core molten material (which may be called "corium") falls onto a lower portion of the reactor pressure vessel, melts through a reactor pressure vessel lower head, and falls onto a floor inside a containment vessel. The corium heats concrete covering the containment vessel floor. When a surface in contact with the concrete becomes hot, the corium reacts with the concrete to generate a large quantity of non-condensable gas containing, e.g., carbon dioxide and hydrogen and to melt and ablate the concrete. The generated non-condensable gas may pressurize the containment vessel and break the reactor containment vessel. The melting and ablation of the concrete may break a containment vessel boundary and decrease structural strength of the containment vessel. If the reaction between the corium and the concrete continues, the containment vessel may break to emit a radioactive material in the containment vessel into the external environment.

In order to inhibit the reaction between the corium and the concrete, it is necessary to cool a surface of a bottom of the corium which is in contact with the concrete to the melt temperature or lower (1500 K or less for typical concretes) or to prevent the corium from coming into direct contact with the concrete. Therefore, various countermeasures are proposed against falling of the corium, as disclosed in, e.g., Patent Documents 1 to 4 (Japanese Patent No. 3510670, Japanese Patent No. 3150451, Japanese Patent Laid-Open No. 2007-225356 (JP-A 2007-225356), and Japanese Patent No. 3424932).

There is a growing need for measures to hold a molten core, at home and abroad. The growing need for measures holds true not only for reactors to be newly built but also for existing reactors. Particularly in existing reactors, safety is ensured by accident management. It is thus desired that hardware remedies for severe accidents, such as installation of a corium holding structure, be applied also to existing reactors.

However, fabrication (installation) of a structure for holding a molten core such as a core catcher (which will be referred to as "corium holding structure", hereinafter) as a measure to hold a molten core by application of conventional techniques as disclosed in Patent Documents described above is not necessarily easy. This applies not only to existing reactors not fabricated on the premise of installment of a corium holding structure but also to reactors to be newly built.

If a corium holding structure is installed in a newly built reactor by applying conventional techniques, it is necessary to lay a heat resisting material in order to thermally protect the structure for holding a molten core and provide a cooling unit for supplying cooling water in order to suppress thermal ablation of the heat resisting material. The heat resisting material needs to be laid after piping or the like serving as a cooling passage is installed, and there are installment constraints such as a need for installation space including space for the cooling passage. Installment of a corium holding structure is thus not necessarily easy.

If a corium holding structure is installed in an existing reactor by applying conventional techniques, the existing reactor not fabricated on the premise of installment of a corium holding structure has no installation space or the existing reactor has enough space but has constraints on installation methods. An existing reactor has more installment constraints than a newly built reactor. Installment of a corium holding structure is thus not necessarily easy.

The idea of installing a corium holding structure without a cooling unit under a heat resisting material is also available in order to facilitate installment of a corium holding structure in a newly built reactor. The idea requires use of an expensive heat resisting material with high heat resistance which can withstand thermal ablation by high-temperature corium, which results in a cost increase for the corium holding structure.

SUMMARY OF THE INVENTION

The present invention has been devised in view of such circumstances, and an object of the present invention is to provide a core catcher having easier installation of a corium holding structure without an increase in installation cost.

In order to attain the object described above, a core catcher in the pressure vessel of a nuclear reactor, the core catcher comprises a holding surface in a portion of the pressure vessel that stores a coolant, the holding surface being configured to catch and hold corium; and a cooling unit which is configured to introduce the stored coolant into the core catcher, to cool a whole of the core catcher including the holding surface by heat exchange with the introduced coolant, wherein the holding surface and the cooling unit are constructed by arranging a plurality of corium holding structures adjacent one another in a lateral array, wherein each of the corium holding structures includes a polyhedron having at least one pair of parallel lateral surfaces and having an opening formed in one of the parallel lateral surfaces, wherein coolant in each of the polyhedrons communicates via the opening with a laterally adjacent polyhedron of communicates with each other via the openings when the polyhedrons are adjacently arranged in the lateral array.

BRIEF DESCRIPTION OF THE DRAWINGS

FIG. 6 (which includes FIGS. 6A and 6B) is explanatory views illustrating a configuration of a core catcher according to a fourth embodiment of the present invention.

DETAILED DESCRIPTION OF THE PREFERRED EMBODIMENTS

Corium holding structures, core catcher (which may be called as "corium holding apparatus"), and core catcher manufacturing methods according to embodiments of the present invention will be described below with reference to the accompanying drawings.

First Embodiment

Figure 1:
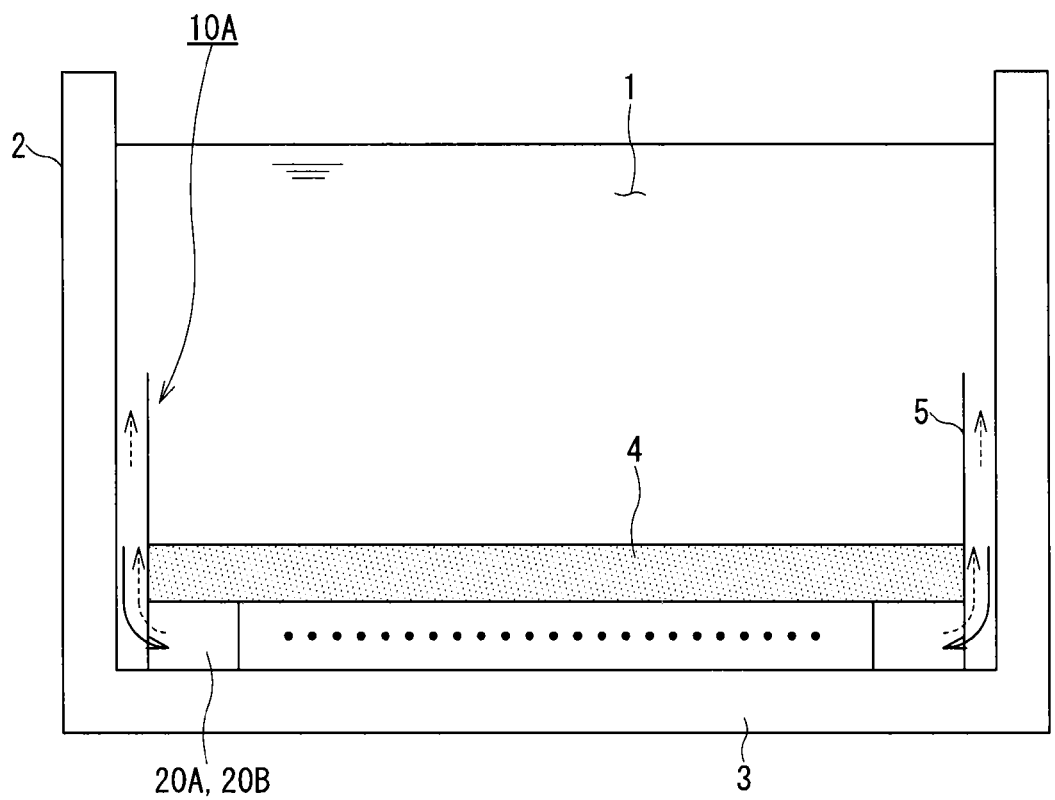
FIG. 1 is a sectional view illustrating a schematic configuration of a core catcher according to a first embodiment of the present invention.
Figure 2:
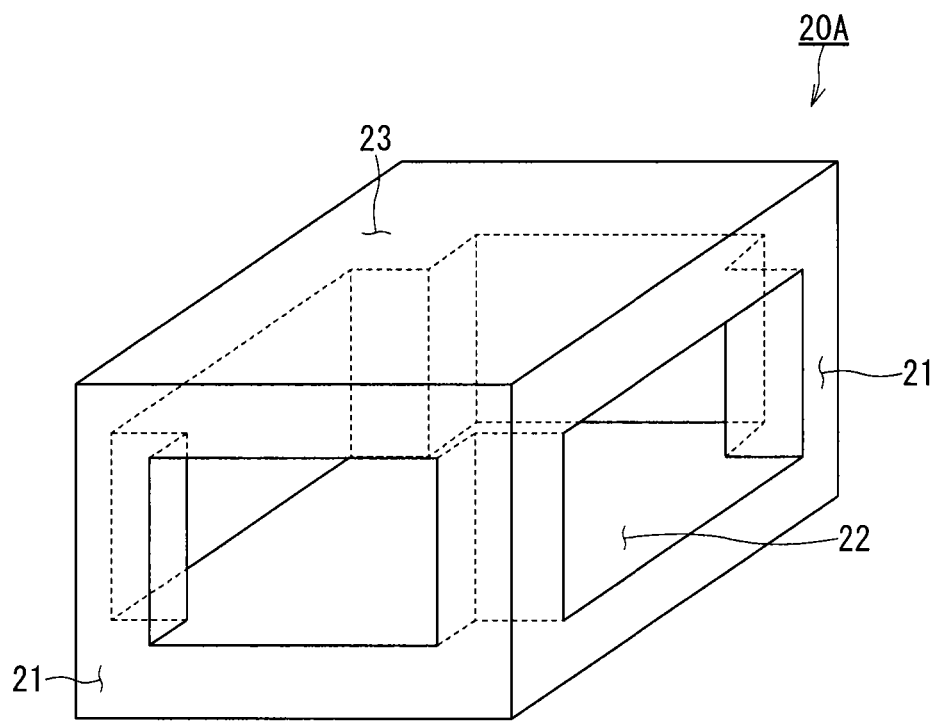
FIG. 2 is a perspective view illustrating a configuration of a first corium holding structure that is an example of a corium holding structure according to the embodiment of the present invention.
Figure 3:
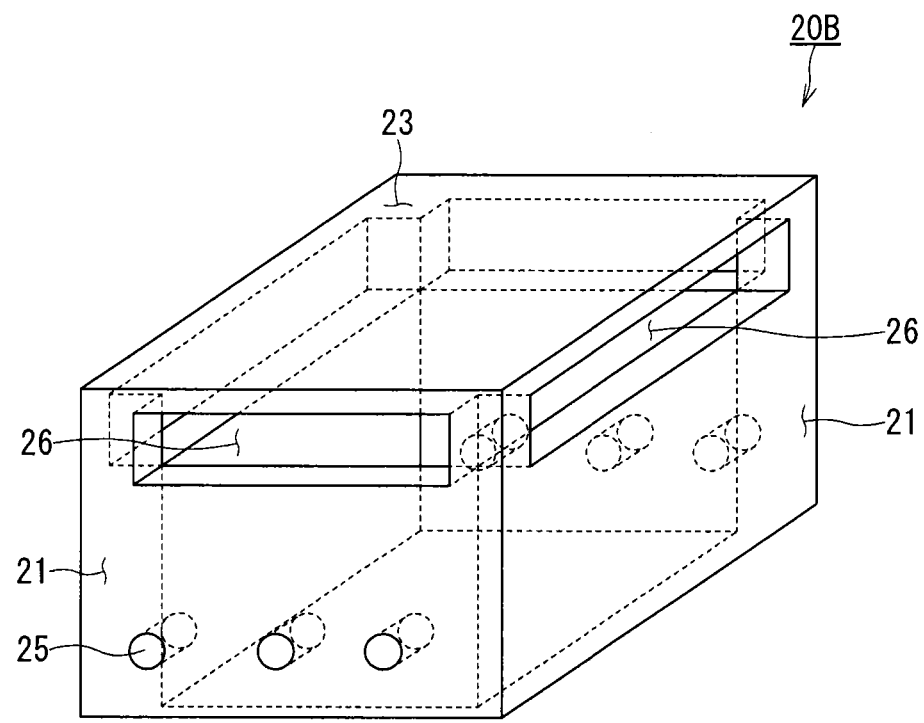
FIG. 3 is a perspective view illustrating a configuration of a second corium holding structure that is another example of a corium holding structure according to the embodiment of the present invention.

FIG. 1 is a sectional view illustrating an overview of a first corium holding apparatus (core catcher) 10A that is a core catcher, as an apparatus to catch and hold corium, according to a first embodiment of the present invention. FIG. 2 is a perspective view illustrating a configuration of a first corium holding structure (block) 20A that is an example of a corium holding structure according to the embodiment of the present invention. FIG. 3 is a perspective view illustrating a configuration of a second corium holding structure (block) 20B that is another example of a corium holding structure according to the embodiment of the present invention. It is noted that solid arrows illustrated in FIG. 1 indicate motions of a coolant 1 and that broken arrows indicate motions of vapor.

The first core catcher 10A is a corium holding structure which is constructed by arranging a plurality of corium holding structures 20 (the first corium holding structures 20A or the second corium holding structures 20B). The first core catcher 10A is configured such that the entire apparatus can be cooled by introducing the coolant 1 (e.g., water accumulated in advance) into an inside space through openings 22 or through-holes 25 formed in the individual corium holding structures 20. That is, the first core catcher 10A is configured so as to be capable of not only exchanging heat at an upper surface in contact with corium (core molten material) 4 but also dissipating heat absorbed by the upper surface to other surfaces (side surfaces and a bottom surface).

The first core catcher 10A is, for example, installed in a closed region which can store the coolant 1 below a reactor pressure vessel (not illustrated) (e.g., a region surrounded by a pedestal side wall 2 and a pedestal floor 3). A riser portion 5 which is raised so as to receive the corium 4 is provided at an edge (on a peripheral side) of the upper surface. The riser portion 5 is made of, for example, a heat resisting material L-shaped in cross section.

As the heat resisting material for the riser portion 5, any material, such as an elemental metal, a ceramic, or an alloy, can be freely selected as long as the material has a melting point higher than about 950 to 1000 degrees Celsius [° C.] that is assumed as temperature of the corium 4 when the fallen corium 4 comes into contact with a surface of the first core catcher 10A cooled by the coolant 1. It is noted that a material having a higher melting point is more preferable as the heat resisting material for the riser portion 5 from the viewpoint of reducing heat damage caused by the corium 4.

The heat resisting material for the riser portion 5 is preferably a material having a melting point not lower than a temperature (about 1200° C. in this example) with a predetermined safety margin of, e.g., 20% of the temperature (about 950 to 1000° C. on average) of the corium 4 in an initial stage immediately after falling into the coolant 1. The heat resisting material is more preferably a material having a melting point higher than the temperature (about 2200° C. on average) of the corium 4 before cooling by the coolant 1. The heat resisting material is still more preferably a material having a melting point not lower than a temperature (about 2640° C. in this example) with a predetermined safety margin of, e.g., 20% of the temperature (about 2200° C. on average) of the corium 4 before cooling by the coolant 1.

Examples of the heat resisting material for the riser portion 5 include elemental metal materials such as gold (Au), silver (Ag), copper (Cu), molybdenum (Mo), tungsten (W), graphite (C), chromium (Cr), beryllium (Be), aluminum (Al), titanium (Ti), and iron (Fe), ceramic materials such as alumina ($Al_2O_3$), zirconia ($ZrO_2$), magnesia (MgO), silicon nitride ($Si_3N_4$), aluminum nitride (AlN), silicon carbide (SiC), and boron nitride (BN), and alloy materials such as copper alloys and aluminum alloys.

In the first core catcher 10A with the above-described configuration, the entire device is cooled in advance by filling the first core catcher 10A with the coolant 1, before falling of the corium 4. The first core catcher 10A holds the corium 4 at an inner portion (on an inner side) surrounded by the riser portion 5. The upper surface holding the corium 4 absorbs heat from the corium 4 and dissipates (transfers) heat to the side surfaces and bottom surface to cool the corium 4. The coolant 1 is taken from outside a periphery of the first core catcher 10A into the inside space (the solid arrows illustrated in FIG. 1) while vapor resulting from absorption of heat is discharged to an outside (the broken arrows illustrated in FIG. 1).

The first corium holding structure 20A is, for example, a structure in the shape of a rectangular parallelepiped, as illustrated in FIG. 2, and has the openings 22 in respective side surfaces 21. The openings 22 serve as a passage (cavity) which allows introduction of the coolant 1 into the inside space. If the first core catcher 10A is constructed by arranging a plurality of first corium holding structures 20A, the first corium holding structures 20A serve as a cooling unit for cooling the first core catcher 10A.

Since the first corium holding structure 20A cools (removes heat from) the corium 4 by absorbing heat of the corium 4 that is an object to be cooled (from which heat is to be removed) at an upper surface 23, transferring heat of the upper surface 23 to other surfaces (the side surfaces 21 and a bottom surface), and dissipating heat from the other surfaces, the first corium holding structure 20A preferably has as high a thermal conductivity as possible. The upper surface of each first corium holding structure 20A arranged in a top tier, in principle, comes into direct contact with the corium 4 (a case with a protective portion 28 illustrated in FIG. 4 (to be described later) is an exception). The first corium holding structure 20A thus preferably has as high a heat resistance as possible.

In view of the above-described circumstances, a first requirement for a material for the first corium holding structure 20A is high thermal conductivity, and a second requirement is high heat resistance.

Examples of a material with high thermal conductivity meeting the first requirement include gold (Au), silver (Ag), copper (Cu), molybdenum (Mo), tungsten (W), graphite (C), beryllium (Be), aluminum (Al), aluminum nitride (AlN), silicon carbide (SiC), copper alloys, and aluminum alloys. As a guide, the material is selected from among materials with thermal conductivity at 0° C. equal to or higher than that of iron (about 83.5 watt per meter Kelvin [W/m·K]).

As for the second requirement, in view of a case without the protective portion 28 illustrated in FIG. 4 (to be described later), the material needs to have at least as high a heat resistance as that of a heat resisting material for the riser portion 5. Accordingly, the material for the first corium holding structure 20A is selected from among materials at least having melting points of about 950 to 1000° C. or more (in the absence of the protective portion 28).

As described above, the first corium holding structure 20A has high thermal conductivity and can efficiently transfer heat from the corium 4 which is received at the upper surface 23 to the side surfaces 21 and lower surface. Additionally, the temperature of the upper surface 23 in contact with the corium 4 is unlikely to rise, and occurrence of heat damage at the upper surface 23 can be reduced. In other words, the first corium holding structures 20A are configured so as to be capable of holding and cooling the corium 4 by themselves.

When a plurality of first corium holding structures 20A are arranged in an array, the adjacent first corium holding structures 20A communicate with each other via the openings 22 to form a passage (cavity) which allows introduction of the coolant 1 into the inside space. Since the individual first corium holding structures 20A can efficiently transfer heat of the upper surfaces 23 to the side surfaces 21 and lower surfaces, the first corium holding structures 20A can be constructed as one corium holding apparatus, such as the first core catcher 10A.

The second corium holding structure 20B is different from the first corium holding structure 20A in that the coolant inlet holes 25 and vapor outlet holes 26 that are through-holes are provided instead of the openings 22, but is not substantially different in other respects.

The second corium holding structure 20B is, for example, a structure in the shape of a rectangular parallelepiped, as illustrated in FIG. 3, and has the coolant inlet holes 25 that are through-holes and the vapor outlet holes 26 for discharging vapor into which the coolant 1 is converted, formed in the side surfaces 21.

The coolant inlet holes 25 are formed, for example, in a region (which will be referred to as a "lower region", hereinafter) corresponding to a bottom surface (a lower surface in FIG. 3) when the side surfaces 21 are divided into two approximately equal portions in a height direction during operation (a vertical direction in FIG. 3) in at least two (e.g., two opposing ones) of the four side surfaces 21. The coolant inlet holes 25 are provided so as to cause the adjacent second corium holding structures 20B to communicate with each other via the coolant inlet holes 25 when a plurality of second corium holding structures 20B are provided. The coolant inlet holes 25 serve as a passage (cavity) which allows introduction of the coolant 1 into the inside space.

Each side surface 21 is required to have a region as large as possible from the viewpoint of increasing thermal conductivity of the second corium holding structure 20B. Accordingly, the coolant inlet holes 25 preferably have a minimum size required to allow the coolant 1 to flow.

In view of the vapor's property of accumulating on an upper side, the vapor outlet holes 26 are formed in a region (which will be referred to as an "upper region", hereinafter) corresponding to the upper surface 23 when the side surfaces 21 are divided into the two approximately equal portions in the height direction during operation. Moreover, for the sake of discharging vapor to the outside of the second corium holding structures 20B, the vapor outlet holes 26 are provided at least so as to cause the adjacent second corium holding structures 20B to communicate with each other when a plurality of second corium holding structures 20B are provided.

The vapor outlet holes 26 are, for example, respectively formed in all the side surfaces 21, as illustrated in FIG. 3. The vapor outlet holes 26 are preferably capable of discharging a larger quantity of vapor to the outside. Accordingly, if the size of the vapor outlet holes 26 is fixed, it is preferable to form the vapor outlet holes 26 in as many side surfaces 21 as possible (three or four side surfaces 21 are preferable to two). Additionally, size of the vapor outlet hole 26 in each side surface 21 is preferably as large as possible.

As described above, although the second corium holding structure 20B has same functions as the functions of the first corium holding structure 20A, the second corium holding structure 20B is more effective at conducting heat to the adjacent corium holding structure 20A or 20B and has a higher cooling capacity than the first corium holding structure 20A.

According to the first core holding apparatus (core catcher) 10A that is constructed by arranging a plurality of first corium holding structures 20A or second corium holding structures 20B described above, the first core catcher 10A can be installed by arranging the corium holding structures 20A or 20B. Accordingly, even if the space for installation is limited as in an existing reactor or the like, the size of the first core catcher 10A can be adjusted by adjustment of the number and arrangement of the corium holding structures 20A or 20B.

That is, the first core catcher 10A can be installed by a same installation (fabrication) method, i.e., arranging the corium holding structures 20A or 20B, regardless of whether size of space for installation is limited. Accordingly, the first corium holding structures 20A or the second corium holding structures 20B enable the installation of a corium holding apparatus such as the first core catcher 10A to be easy without an increase in installation cost.

The corium holding structures 20A or 20B constituting the first core catcher 10A can hold the corium 4 at the upper surfaces 23 of the corium holding structures 20A or 20B and can supply the coolant 1 into an internal cavity through the openings 22 or 25. Accordingly, the corium holding structures 20A or 20B can effectively remove heat from the held corium 4 through boiling heat transfer to the coolant 1.

Further, the corium holding structures 20A or 20B constituting the first core catcher 10A are made of, e.g., a material with high thermal conductivity, such as copper. Due to the thermal conductivity, the upper surfaces 23 are unlikely to rise in temperature, and occurrence of heat damage can be reduced.

Furthermore, if the first core catcher 10A is constructed using the second corium holding structures 20B, the first core catcher 10A has a smaller opening area in the lower region of each side surface 21 and a larger area of contact with the coolant 1 than a case where the first core catcher 10A is constructed using the first corium holding structures 20A. Accordingly, effectiveness in removing heat of each side surface 21 and conduction of heat to a lower side (bottom surface side) can be increased, and cooling capacity can be improved.

It is noted that the corium holding structure 20A or 20B need not be a rectangular parallelepiped. The corium holding structure 20A or 20B may be any polyhedron as long as at least a plurality of corium holding structures 20A or 20B can be arranged so as to have, as upper surfaces, surfaces which can hold the corium 4, and the openings 22 or the through-holes 25 and 26 can be formed in a lateral direction. For example, the corium holding structure 20A or 20B may be a regular dodecahedron or a hexagonal pole.

The corium holding structures 20A or 20B need not be arranged in the shape of an approximate circle as viewed from above. The corium holding structures 20A or 20B may be arranged in the shape of a polygon.

Second Embodiment

Figure 4:
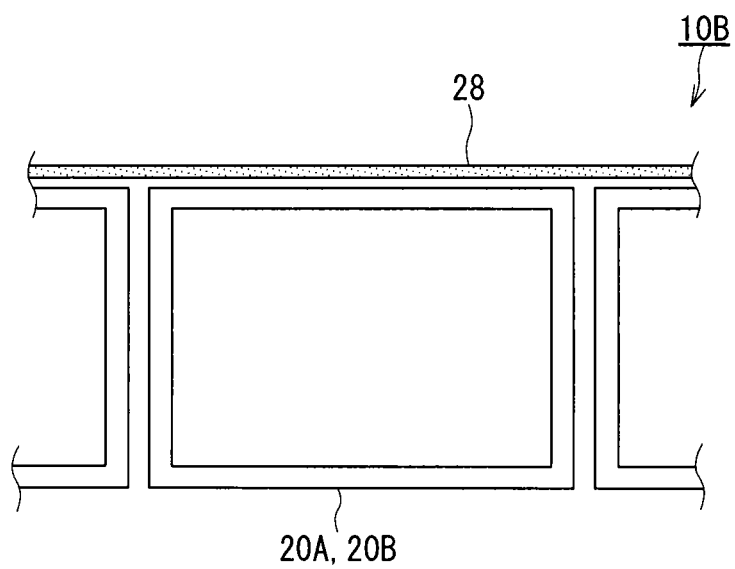
FIG. 4 is a local sectional view schematically illustrating, on an enlarged scale, a part of a core catcher according to a second embodiment of the present invention.

FIG. 4 is a local sectional view schematically illustrating, on an enlarged scale, a part of a second corium holding apparatus (core catcher) 10B that is a core catcher according to a second embodiment of the present invention.

The second core catcher 10B is different from the first core catcher 10A in that a protective portion 28 which protects corium holding structures 20 (20A or 20B) and prevents corium 4 from entering into clearance between the corium holding structures 20 is further provided on a surface for holding the corium 4, i.e., on an inner side surrounded by a riser portion 5 and on upper surfaces 23 of the corium holding structures 20.

The protective portion 28 is a component responsible for protecting the corium holding structures 20 from the corium 4 at high temperatures (about 2200° C. on average before cooling) and preventing the corium 4 from entering into a clearance between the corium holding structures 20. Thus, the protective portion 28 needs to have heat resistance at least equal to or higher than that of a heat resisting material for the riser portion 5 and that of the corium holding structures 20A or 20B.

A material for the protective portion 28 can be selected from among, e.g., elemental metal materials, ceramic materials, and alloy materials similar to the heat resisting material for the riser portion 5. To impart heat resistance enough to withstand temperature of the corium 4 before cooling by a coolant 1, zirconia ($ZrO_2$), alumina ($Al_2O_3$), molybdenum (Mo), tungsten (W), and graphite (C) are preferable.

The second core catcher 10B can achieve the same advantages as those of the first core catcher 10A. In addition, since a boundary can be formed between the corium 4 and the corium holding structures 20 by covering the corium holding structures 20 with the protective portion 28, direct ablation (heat damage) of the corium holding structures 20 by the corium 4 can be prevented. Moreover, the corium 4 can be prevented from entering into clearance between the corium holding structures 20 by covering the corium holding structures 20 with the protective portion 28.

Third Embodiment

Figure 5:
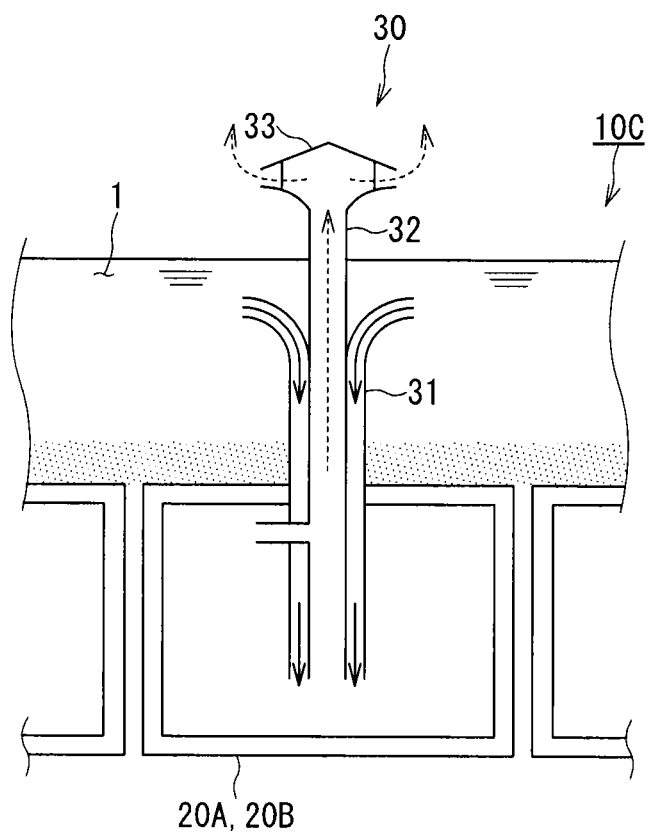
FIG. 5 is a local sectional view schematically illustrating, on an enlarged scale, a part of a core catcher according to a third embodiment of the present invention.

FIG. 5 is a local sectional view illustrating, on an enlarged scale, an overview of a third core catcher 10C that is a core catcher according to a third embodiment of the present invention. It is noted that solid arrows illustrated in FIG. 5 indicate motions of a coolant 1 and that broken arrows indicate motions of vapor.

The third core catcher 10C is different from the first core catcher 10A in that a double tube structure 30 as a coolant inlet and vapor outlet unit serving both as a coolant inlet unit which introduces the coolant 1 into an inside space of corium holding structures 20 (20A or 20B) and a vapor outlet unit which discharges vapor to an outside is further provided, but is not substantially different in other respects. Accordingly, same components as those in the first core catcher 10A are denoted by same reference numerals in the description of the third embodiment, and a description of the components will be omitted.

The third core catcher 10C is constructed by arranging a plurality of corium holding structures 20 (the first corium holding structures 20A or the second corium holding structures 20B). The double tube structure 30 that introduces the coolant 1 from the outside into the inside space and discharges vapor generated in the inside space to the outside is provided in each of at least one of the corium holding structures 20 constituting the third core catcher 10C.

The double tube structure 30 includes an outer tube 31 as the coolant inlet unit which introduces the coolant 1 from the outside into the inside space and an inner tube 32 as the vapor outlet unit which discharges vapor generated in the inside space to the outside. An upper end of the outer tube 31 is located inside the space for the coolant 1 and is laterally bent for preventing a falling object from above, such as corium 4, from entering. In contrast, an upper end of the inner tube 32 is located above a surface of the coolant 1. A protector 33 is provided at the upper end for preventing a falling object from above from entering, and for protecting the double tube structure 30.

The protector 33 may have any arbitrary shape as long as the protector 33 has a function of preventing a falling object from above from entering, and protecting the double tube structure 30. For example, the protector 33 illustrated in FIG. 5 is formed in an approximately conical or pyramidal shape with a portion at and near a center of the double tube structure 30 higher than a peripheral portion such that a falling object from above is unlikely to stay on the protector 33, i.e., it is likely to fall toward the surroundings.

As described above, the double tube structure 30 is configured such that the outer tube 31 that is a system for introducing the coolant 1 from the outside into the inside space and the inner tube 32 that is a system for discharging vapor generated in the inside space to the outside are separate but are integrally formed. The configuration allows the supply of the coolant 1 and discharge of vapor with efficiency and space saving.

Additionally, the double tube structure 30 as the coolant inlet and vapor outlet unit is configured such that the vapor discharge unit (the inner tube 32) for discharging vapor to the outside is provided inside (on an inner peripheral side of) the coolant inlet unit (the outer tube 31) for introducing the coolant 1 into the inside space. The configuration allows the coolant inlet unit to cool the vapor discharge unit with the flowing coolant 1 and prevents the vapor discharge unit from being broken by high heat.

The third core catcher 10C achieves the same advantages as those of the first core catcher 10A. In addition, the third core catcher 10C further includes the coolant inlet unit and vapor discharge unit (e.g., the double tube structure 30). The coolant 1 is introduced also through the coolant inlet unit (e.g., the outer tube 31) into the inside space, and vapor in the inside space is discharged through the vapor discharge unit (e.g., the inner tube 32) to the outside. Accordingly, the third core catcher 10C can cool the corium 4 more efficiently than the first core catcher 10A without the coolant inlet unit and vapor outlet unit.

Additionally, the third core catcher 10C includes, as the coolant inlet unit and vapor outlet unit, the coolant inlet and vapor outlet unit (e.g., the double tube structure 30) in which a system for introducing the coolant 1 from the outside into the inside space and a system for discharging vapor generated in the inside space to the outside are separate but are integrally formed. With this configuration, the third core catcher 10C can supply the coolant 1 and discharge vapor with efficiency and can save space.

Moreover, when the double tube structure 30 as the coolant inlet and vapor outlet unit is provided, the inner tube 32 as the vapor outlet unit for discharging vapor to the outside is provided on an inner diameter side, and the outer tube 31 as the coolant inlet unit for introducing the coolant 1 into the inside space is provided on an outer diameter side. Since the coolant inlet unit cools the vapor discharge unit with the flowing coolant 1, the vapor outlet unit can be prevented from suffering heat damage.

The double tube structure 30 is configured from the viewpoint of preventing a falling object from above from causing breakage, wherein the upper end of the outer tube 31 is laterally bent and the protector 33 is provided at the upper end of the inner tube 32. However, if there is a good reason, such as little risk of breakage, the double tube structure 30 need not be provided in the above-described manner.

For example, assume a case where the double tube structure 30 as the coolant inlet unit and vapor outlet unit is provided directly below a control rod drive mechanism (which will be referred to as "CRD", hereinafter). Since the CRD is provided with a drop prevention mechanism, even if the high-temperature corium 4 deposited below the reactor pressure vessel jets from, e.g., a meter run toward a lower portion of a containment vessel, the jetting corium 4 is not expected to fall on the double tube structure 30 as the coolant inlet unit and vapor outlet unit.

Fourth Embodiment

Figure 6A:
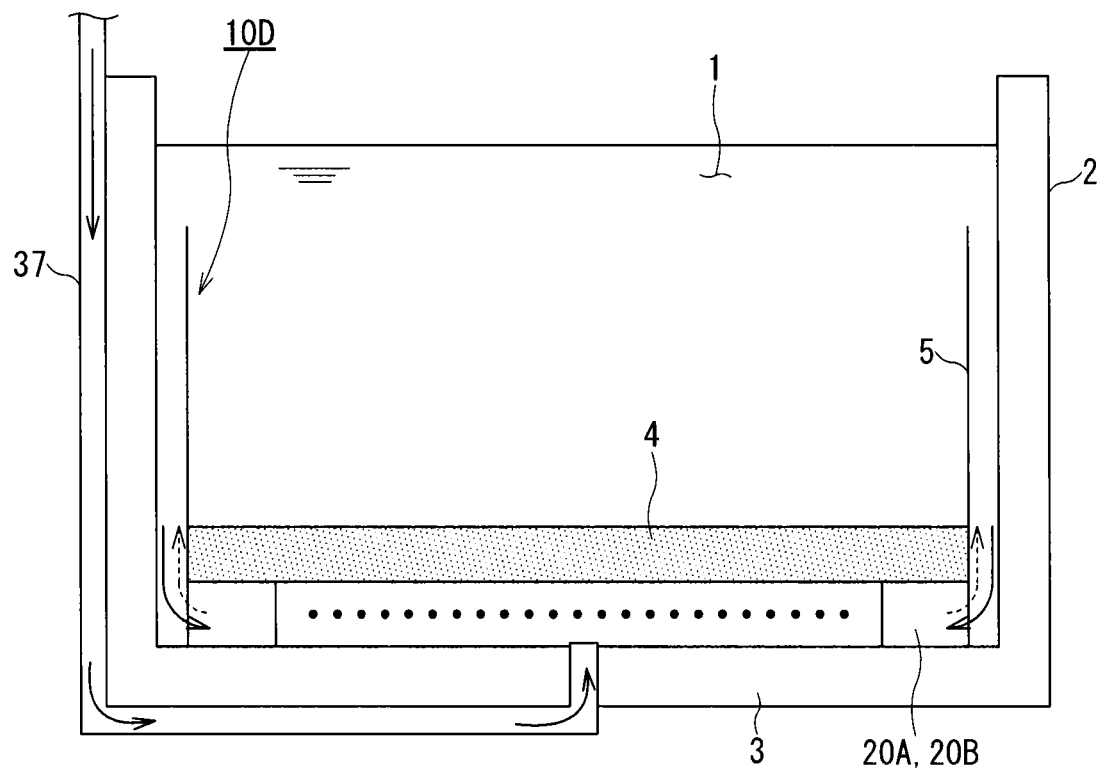
FIG. 6A is a sectional view.
Figure 6B:
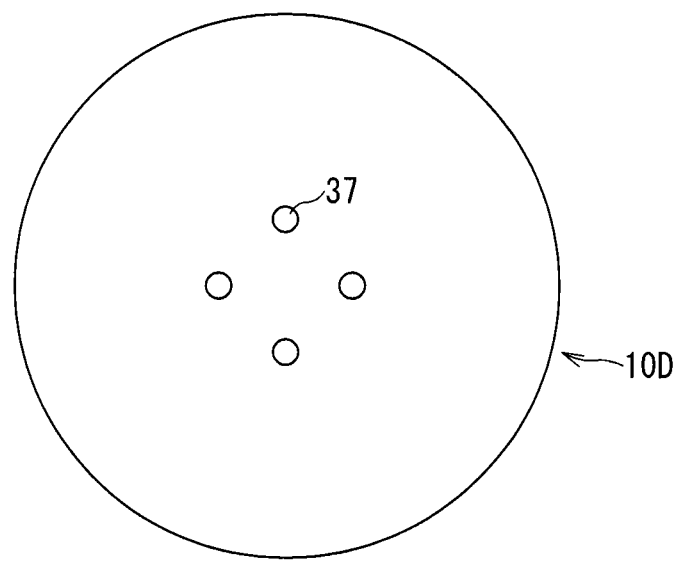
FIG. 6B is a bottom view.

FIG. 6 (which includes FIGS. 6A and 6B) is explanatory views illustrating an overview of a fourth corium holding apparatus (core catcher) 10D that is a core catcher according to a fourth embodiment of the present invention. More specifically, FIG. 6A is a sectional view of the fourth core catcher 10D, and FIG. 6B is a bottom view of the fourth core catcher 10D.

The fourth core catcher 10D is different from the first core catcher 10A in that an inlet pipe element 37 which introduces a coolant 1 is further provided but is not substantially different in other respects. Accordingly, the same components as those in the first core catcher 10A are denoted by the same reference numerals in a description of the fourth embodiment, and a description of the components will be omitted.

The fourth core catcher 10D is constructed by arranging a plurality of corium holding structures 20 (the first corium holding structures 20A or the second corium holding structures 20B), like the first core catcher 10A. As illustrated in FIGS. 6A and 6B, the fourth core catcher 10D includes the inlet pipe element 37 which introduces a coolant 1 into an inside space at each of, e.g., four positions.

Positions and the number of the inlet pipe element 37 are arbitrary. It is presumed that since the coolant 1 flows from outside a periphery into the inside through openings 22 or through-holes 25 in the fourth core catcher 10D or the like constructed by arranging a plurality of corium holding structures 20, the difficulty of the coolant 1 in flowing into a region at and near a center (which will be referred to as a "central region", hereinafter) increases with an increase in diameter (an increase in the number of the inlet pipe element 37 in a radial direction). It is thus preferable to connect the inlet pipe element 37 to the central region.

The central region here refers to a region which is located closer to a center of a shape (an approximate circle in FIGS. 6A and 6B) of the fourth core catcher 10D as viewed from above than to an outer edge (peripheral edge) of the shape.

For example, in the fourth core catcher 10D illustrated in FIGS. 6A and 6B, the central region is a region corresponding to a concentric circle having a diameter about half of a diameter of an approximate circle in a cross section taken in a direction orthogonal to an axial direction. In the fourth core catcher 10D illustrated in FIGS. 6A and 6B, four inlet pipe elements 37 are provided in the central region, as illustrated in FIG. 6B.

It is noted that the coolant 1 supplied through the inlet pipe element 37 may be supplied from outside a reactor containment vessel or may be drainage (water) accumulated in the reactor containment vessel. Alternatively, some of the inlet pipe element 37 provided in the fourth core catcher 10D may supply the coolant 1 from outside the reactor containment vessel, and others may supply drainage accumulated in the reactor containment vessel as the coolant 1.

The fourth core catcher 10D achieves the same advantages as those of the first core catcher 10A. In addition, the fourth core catcher 10D can introduce a coolant 1 other than the coolant 1 stored on the fourth core catcher 10D into the inside through the inlet pipe element 37. Accordingly, the fourth core catcher 10D can cool the corium 4 more efficiently than the first core catcher 10A or the like without the inlet pipe element 37.

Moreover, the fourth core catcher 10D has the inlet pipe element 37 arranged in the central region. Accordingly, the fourth core catcher 10D exhibits less variations in temperature than the first core catcher 10A or the like without the inlet pipe element 37 and can cool the corium 4 in a balanced manner. Further, use of drainage (water) accumulated in the reactor containment vessel eliminates a need to separately supply the coolant 1 from outside the reactor containment vessel.

Fifth Embodiment

Figure 7:
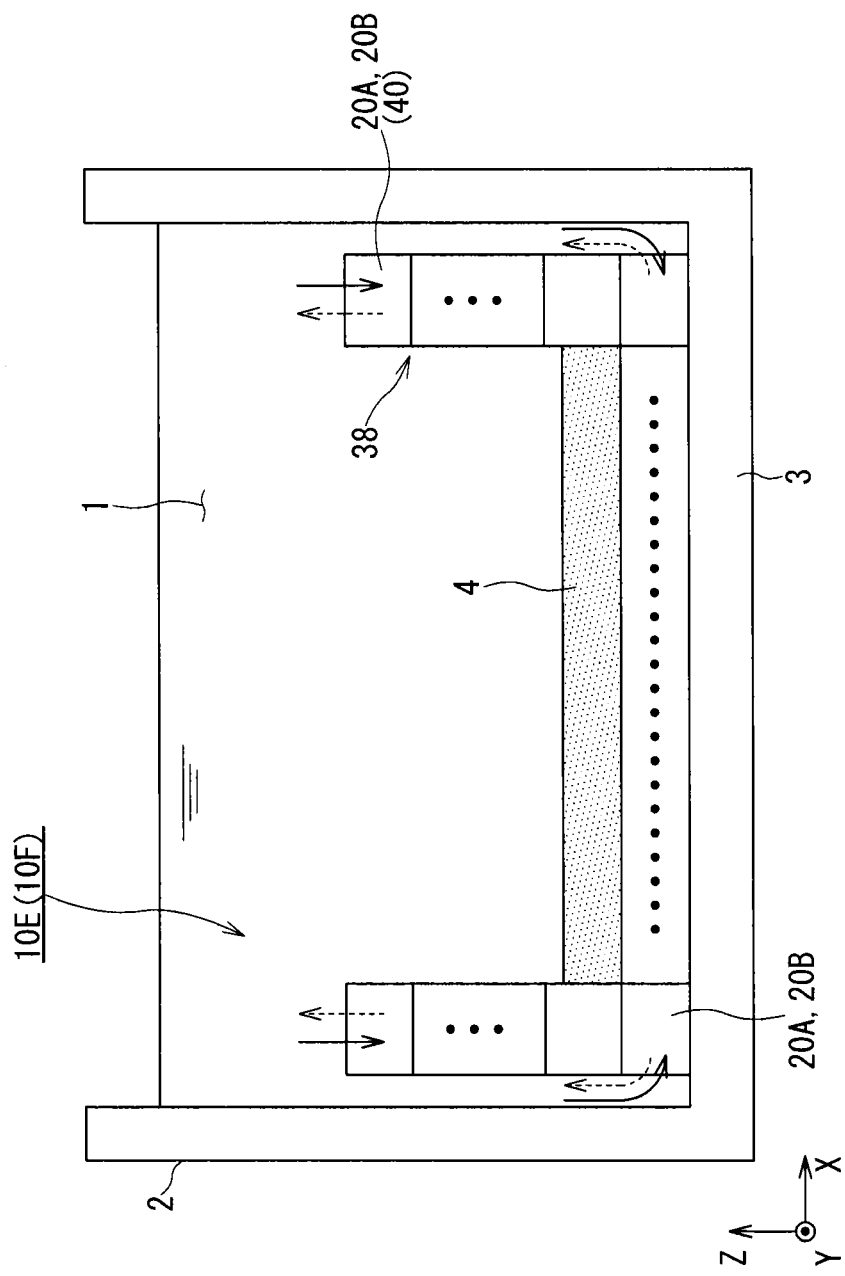
FIG. 7 is a local sectional view schematically illustrating core catchers according to fifth and sixth embodiments of the present invention.

FIG. 7 is a local sectional view illustrating an overview of a fifth corium holding apparatus (core catcher) 10E that is a core catcher according to a fifth embodiment of the present invention and a sixth corium holding apparatus (core catcher) 10F that is a core catcher according to a sixth embodiment. It is noted that solid arrows illustrated in FIG. 7 indicate motions of a coolant 1 and that broken arrows indicate motions of vapor. X-, Y-, and Z-axes illustrated in FIG. 7 correspond to X-, Y-, and Z-axes illustrated in FIGS. 8 and 9 (which will be referred later).

The fifth core catcher 10E is different from the first core catcher 10A in that a riser portion 38 which is constructed by arranging corium holding structures 20 (20A or 20B) is provided instead of the riser portion 5, but is not substantially different in other respects. Accordingly, the same components as those in the first core catcher 10A are denoted by same reference numerals in the description of the fifth embodiment, and a description of the components will be omitted.

The fifth core catcher 10E is constructed by arranging a plurality of corium holding structures 20 (the first corium holding structures 20A or the second corium holding structures 20B), like the first core catcher 10A, and further arranging the ones in an outermost row so as to be higher than the ones in other rows.

The corium holding structures 20 arranged in the outermost row serve as the riser portion 38 of the fifth core catcher 10E. The height of the riser portion 38 (the number of tiers) is set so as to be higher than corium 4 and be lower than a water level of the coolant 1.

The riser portion 38 has a cooling passage formed by the openings 22 or through-holes 25 and the like of the corium holding structures 20 in an inside. Accordingly, the riser portion 38 not only plays the same role as the riser portion 5 provided in the first core catcher 10A or the like but also has a function of cooling by the coolant 1.

Figure 8:
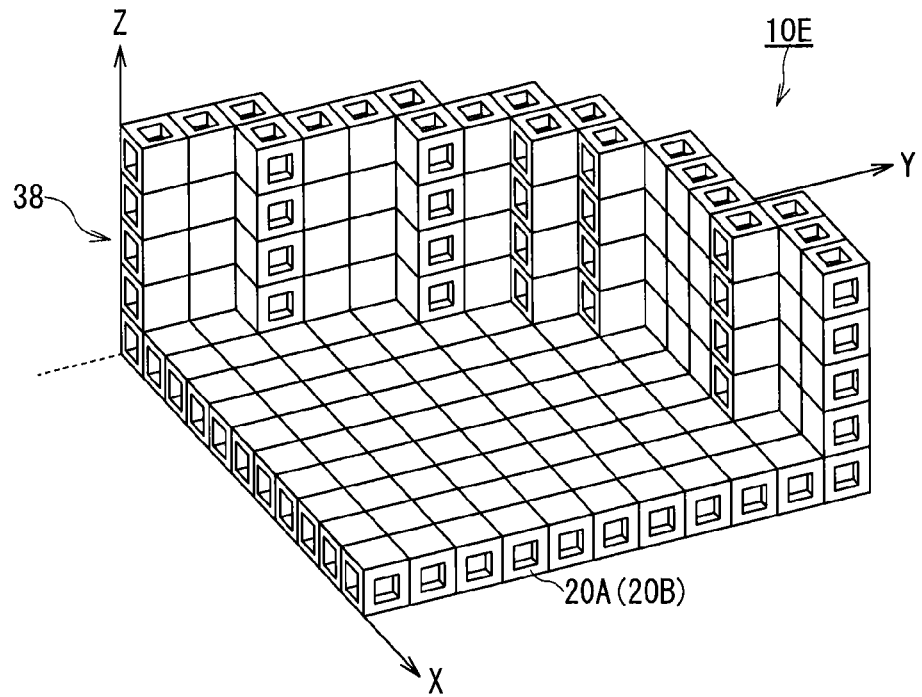
FIG. 8 is a partial perspective view schematically illustrating a part of the core catcher according to the fifth embodiment of the present invention.

FIG. 8 is a partial perspective view schematically illustrating a part (a quarter in a circumferential direction) of the fifth core catcher 10E that is a core catcher according to the fifth embodiment of the present invention.

The fifth core catcher 10E is constructed by, e.g., arranging a plurality of corium holding structures 20 with open side surfaces 21 (e.g., the first corium holding structures 20A). The riser portion 38 is constructed by arranging the corium holding structures 20 with the open side surfaces 21 in a 90-degree (90°) orientation to the corium holding structures 20 mentioned earlier.

If the corium holding structures 20 with the open side surfaces 21 are arranged in the 90° orientation, the openings 22 or the through-holes 25 and 26 of some of the corium holding structures 20 constituting the riser portion 38 face toward an inner side, i.e., a side where the corium 4 is held. For this reason, the corium holding structures 20 merely for plugging the openings 22 or the through-holes 25 and 26 are arranged in the fifth core catcher 10E in order to prevent the corium 4 from entering into an inside of the corium holding structures 20 constituting the riser portion 38 through the openings 22 or the through-holes 25 and 26.

The corium holding structures 20 arranged merely to plug the openings 22 or the through-holes 25 and 26 in the fifth core catcher 10E illustrated in FIG. 8 will be described. For example, of the corium holding structures 20 constituting the riser portion 38, the four corium holding structures 20 located in a second row in an X-axis direction and in a third row in a Y-axis direction from an origin (an intersection of the coordinate axes) are arranged merely to plug the openings 22 or the through-holes 25 and 26 that are open in the Y-axis direction of the four adjacent corium holding structures 20 located in the second row in the X-axis direction and in a fourth row in the Y-axis direction.

The fifth core catcher 10E achieves same advantages as those of the first core catcher 10A. In addition, since the riser portion 38 can be constructed using the corium holding structures 20, a whole of the fifth core catcher can be constructed using only the corium holding structures 20 and therefore reduce installation (manufacturing) cost. Furthermore, the riser portion 38 has a cooling function and can prevent the riser portion 38 from being broken due to a temperature rise.

It is noted that the fifth core catcher 10E need not be constructed using corium holding structures of the same type, i.e., only the first corium holding structures 20A or the second corium holding structures 20B. The fifth core catcher 10E may be constructed using the first corium holding structures 20A and second corium holding structures 20B in combination (e.g., by constructing the riser portion 38 using the first corium holding structures 20A and constructing a remainder using the second corium holding structures 20B).

Sixth Embodiment

Figure 9:
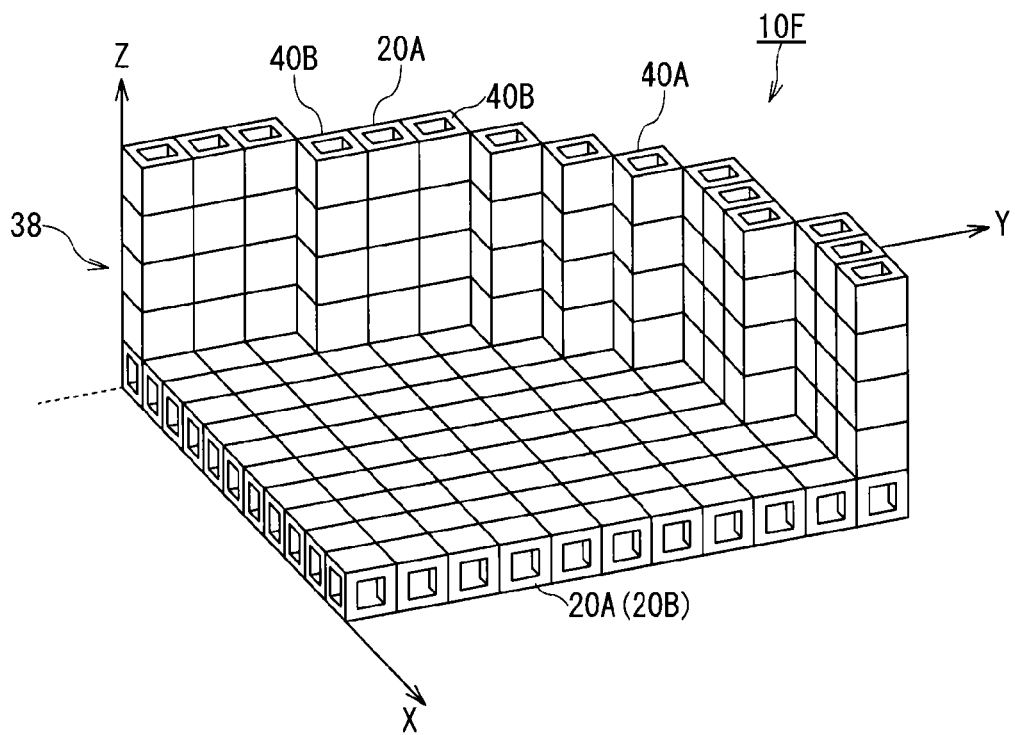
FIG. 9 is a partial perspective view schematically illustrating a part of the core catcher according to the sixth embodiment of the present invention.

FIG. 9 is a partial perspective view schematically illustrating a part of a sixth core catcher 10F that is a core catcher according to a sixth embodiment of the present invention.

The sixth core catcher 10F is different from the fifth core catcher 10E in that corium holding structures 40A and 40B with openings formed only in one pair of opposing directions are used instead of some of corium holding structures 20 constituting a riser portion 38, but is not substantially different in other respects. Accordingly, the same components as those in the fifth core catcher 10E are denoted by the same reference numerals in a description of the sixth embodiment, and a description of the components will be omitted.

To construct the sixth core catcher 10F, a plurality of corium holding structures 20 (first corium holding structures 20A or second corium holding structures 20B) are arranged in the same manner as that for the fifth core catcher 10E. With this operation, the sixth core catcher 10F including the riser portion 38 is constructed. The height of the riser portion 38 (the number of tiers) is set so as to be higher than corium 4 and be lower than a water level of a coolant 1.

For the sixth core catcher 10F, a corium holding structure 40A which has openings formed only in one pair of opposing surfaces and a corium holding structure 40B which has openings formed in three of four surfaces and whose surfaces with the openings form a U shape are prepared from the viewpoint of eliminating a need for the corium holding structures 20 merely for plugging the openings 22 or the through-holes 25 and 26 present in the fifth core catcher 10E.

In the sixth core catcher 10F, the riser portion 38 is constructed by appropriately combining the corium holding structures 40A and 40B and the corium holding structures 20. Accordingly, the riser portion 38 can be configured so as not to have the openings 22 or the through-holes 25 and 26 open to an inner side, i.e., a side where the corium 4 is held, without arranging the unnecessary corium holding structures 20.

Of the riser portion 38 of the sixth core catcher 10F, in a portion constructed by arranging the corium holding structures 20 and 40B (e.g., a total of 12 (three in a Y-axis direction by four in a Z-axis direction located in a second row in an X-axis direction from an origin in FIG. 9) corium holding structures 20 and 40B), adjacent ones of the corium holding structures 20 and 40B can communicate with each other. Accordingly, the cooling capacity of the riser portion 38 of the sixth core catcher 10F can be made higher than the cooling capacity of the riser portion 38 of the fifth core catcher 10E.

The sixth core catcher 10F achieves the same advantages as those of the fifth core catcher 10E. In addition, there is no need for the unnecessary corium holding structures 20 required merely to plug the openings 22 when the riser portion 38 of the fifth core catcher 10E is formed. Accordingly, the number of corium holding structures 20, 40A, and 40B required to construct the sixth core catcher 10F can be reduced.

Moreover, according to the sixth core catcher 10F, the riser portion 38 can be configured such that the corium holding structures 20 adjacent in a Z-axis direction communicate with each other, like the riser portion 38 of the fifth core catcher 10E. Not only that, but the riser portion 38 can be configured such that the corium holding structures 20 and 40B adjacent in the X-axis or Y-axis direction communicate with each other. Accordingly, the riser portion 38 can be configured so as to have higher cooling capacity than that of the riser portion 38 of the fifth core catcher 10E. That is, the sixth core catcher 10F including the riser portion 38 that is more resistant to heat damage than the riser portion 38 of the fifth core catcher 10E can be constructed.

It is noted that although an example in which the riser portion 38 is formed by combining the corium holding structures 20, 40A, and 40B has been illustrated as the sixth core catcher 10F illustrated in FIG. 9, the riser portion 38 may be formed using only the corium holding structures 40A.

As described above, according to the corium holding structures, core catchers (corium holding apparatuses), and corium holding apparatus manufacturing methods of the embodiments of the present invention, a corium holding apparatus can be installed by a same installation (fabrication) method, i.e., arranging corium holding structures, regardless of whether size of space for installation is limited. Therefore, the corium holding structures of the embodiments of the present invention enable the installation of a corium holding apparatus (core catcher) to be easy without an increase in installation cost.

Further, according to the corium holding structures, core catchers, and corium holding apparatus manufacturing methods of the embodiments of the present invention, the corium 4 can be held at upper surfaces of laid corium holding structures in a top tier, and the coolant 1 can be supplied into an internal cavity through openings. Accordingly, heat can be effectively removed from the held corium 4 through boiling heat transfer to the coolant 1.

Moreover, the corium holding structures and core catchers of the embodiments of the present invention are made of materials with high thermal conductivity. Due to the thermal conductivity, upper surfaces are unlikely to rise in temperature, and occurrence of heat damage can be reduced.

It is noted that the present invention is not limited to the above-described embodiments as they are and, in an implementation phase, can be embodied in various forms other than the specific embodiments described above. Various omissions, additions, substitutions, and changes may be made without departing from the spirit and scope of the invention. These embodiments and modifications thereof are included within the sprit and scope of the invention and are included within the scope of the invention as disclosed in the claims and equivalents thereof.

What is claimed is:

1. A core catcher in a nuclear reactor, the core catcher comprising:
   a holding surface in a portion of the reactor that stores a coolant, the holding surface being configured to catch and hold corium; and
   a cooling unit which is configured to introduce the stored coolant into the core catcher, to cool a whole of the core catcher including the holding surface by heat exchange with the introduced coolant,
   wherein the holding surface and the cooling unit are constructed by arranging a plurality of corium holding structures laterally adjacent one another in a horizontally extending array, wherein each of the corium holding structures includes a polyhedron having at least one pair of parallel lateral surfaces and defining an inside space in the polyhedron, each corium holding structure further having an opening formed in one of the parallel lateral surfaces, the opening extending from the lateral surface to the inside space and being positioned on the corium holding structure to communicate the inside space of the respective corium holding structure with an inside space of and adjacent corium holding structure arranged in the in the horizontally extending array,
   wherein coolant in each of the polyhedrons communicates via the opening with a laterally adjacent polyhedron of the lateral array.

2. The core catcher according to claim 1, further comprising a coolant supply unit which is configured to supply a coolant other than the stored coolant to a floor surface on which the corium holding structures are arranged.

3. The core catcher according to claim 2, wherein the coolant supply unit is installed closer to a center of the core catcher as viewed from above than to an outer edge of the core catcher.

4. The core catcher according to claim 1, further comprising a riser protruding upward at an outer edge of the holding surface, to hold the corium on the holding surface in the lateral direction, wherein the riser comprises a stack of the corium holding structures.

5. The core catcher according to claim 4, wherein the corium holding structures are each configured as rectangular parallelepiped and the riser portion is constructed by a rectangular parallelepiped having an opening portion in at least two surfaces thereof.

6. The core catcher according to claim 1, further comprising a second coolant inlet unit that introduces the coolant into a corium holding structure of the plurality of arranged corium holding structures, and a vapor outlet unit that discharges vapor from inside the corium holding structure.

7. The core catcher according to claim 6, wherein the second coolant inlet unit and the vapor outlet unit are integrally constructed as a double tube structure which includes an inner tube and an outer tube, each having different diameters and being concentrically arranged with each other.

8. The core catcher according to claim 7, wherein the double tube structure includes the inner tube as the vapor outlet unit and the outer tube as the second coolant inlet unit.

9. The core catcher according to claim 6, wherein the second coolant inlet unit and the vapor outlet unit are installed directly below a control rod drive mechanism.

10. The core catcher according to claim 1, further comprising a protective portion provided on an upper surface of the corium holding structure, which integrally covers a whole of the upper surface of the corium holding structure.

* * * * *